(12) United States Patent
Cocchi et al.

(10) Patent No.: US 11,213,046 B2
(45) Date of Patent: Jan. 4, 2022

(54) UNIT FOR RECEIVING AND TREATING CAPSULES CONTAINING A BASIC PREPARATION FOR AN ICE CREAM PRODUCT

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 79 days.

(21) Appl. No.: 16/452,034

(22) Filed: Jun. 25, 2019

(65) Prior Publication Data

US 2020/0000120 A1    Jan. 2, 2020

(30) Foreign Application Priority Data

Jun. 29, 2018  (IT) .................. 102018000006810

(51) Int. Cl.
*A23G 9/28* (2006.01)
*A23G 9/12* (2006.01)
*A23G 9/22* (2006.01)

(52) U.S. Cl.
CPC ............... *A23G 9/28* (2013.01); *A23G 9/12* (2013.01); *A23G 9/224* (2013.01)

(58) Field of Classification Search
CPC . A23G 9/28; A23G 9/12; A23G 9/224; A23G 9/22; A23G 9/08; A23G 9/225; A23G 9/227; A23G 9/287
See application file for complete search history.

(56) References Cited

U.S. PATENT DOCUMENTS

2012/0220438 A1* 8/2012 Herholdt .............. A24D 3/0216
                                                                    493/39
2017/0112165 A1* 4/2017 Cocchi ..................... A23G 9/08

FOREIGN PATENT DOCUMENTS

| EP | 1517664 A1 | 3/2005 |
| EP | 2896304 A1 | 7/2015 |
| EP | 3081093 A1 | 10/2016 |
| EP | 3158872 A1 | 4/2017 |
| GB | 885287 A | 12/1961 |

OTHER PUBLICATIONS

Italian Search Report dated Feb. 20, 2019 from counterpart Italian App No. 2018000006810.

* cited by examiner

*Primary Examiner* — Elizabeth J Martin
(74) *Attorney, Agent, or Firm* — Shuttleworth & Ingersoll, PLC; Timothy Klima

(57) ABSTRACT

A unit for receiving and treating capsules containing a basic preparation for an ice cream product includes a retaining unit and an expulsion device. The retaining unit is provided with a retaining housing configured to receive a capsule containing a basic preparation for an ice cream product. The expulsion device comprises a nozzle which is connectable to a compressed air source and which is configured to emit a jet of air in the direction of the retaining unit and adapted to strike the capsule when the latter is inside the retaining housing in such a way as to expel the capsule along an expulsion direction.

13 Claims, 4 Drawing Sheets

UNIT FOR RECEIVING AND TREATING CAPSULES CONTAINING A BASIC PREPARATION FOR AN ICE CREAM PRODUCT

This application claims priority to Italian Patent Application 102018000006810 filed Jun. 29, 2018, the entirety of which is incorporated by reference herein.

BACKGROUND OF THE INVENTION

This invention relates to the field of the production of liquid and semi-liquid products for the ice cream sector.

In particular, this invention relates to a unit for receiving and treating capsules containing a basic preparation for an ice cream product, for example, containing a basic preparation for an ice cream product.

As is known, a need which is strongly felt in this sector is that of being able to make ice cream type products in small portions very quickly and to a customer's individual request.

In effect, customers often demand to be able to have food products made on the spot to their specifications.

A need which is felt particularly strongly by machine manufacturers is that of having a machine capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

In this context, the technical purpose which forms the basis of the present invention is to propose a unit for receiving and treating capsules containing a basic preparation for an ice cream product to overcome at least some of the disadvantages of the prior art.

In particular, this invention has for an aim to provide a unit for receiving and treating capsules containing a basic preparation for an ice cream product, where the unit is capable of controlling the movement, specifically the expulsion, of a capsule in a highly efficient and automated manner, thereby also reducing the risk of product contamination.

The technical purpose indicated and the aims specified are substantially achieved by a unit for receiving and treating capsules containing a basic preparation for an ice cream product, comprising the technical features described in one or more of the accompanying claims.

This invention discloses a unit for receiving and treating capsules containing a basic preparation for an ice cream product characterized in that it comprises a retaining unit and an expulsion device.

The retaining unit is provided with a retaining housing configured to receive a capsule containing a basic preparation for an ice cream product.

The expulsion device comprises a nozzle which is connectable to a compressed air source and which is configured to emit a jet of air in the direction of the retaining unit and adapted to strike the capsule when the latter is inside the retaining housing in such a way as to expel the capsule along an expulsion direction.

The dependent claims, which are incorporated herein by reference, correspond to different embodiments of the invention.

BRIEF DESCRIPTION OF THE DRAWINGS

Further features and advantages of the present invention are more apparent in the non-limiting description below, with reference to a preferred but non-exclusive embodiment of a unit for receiving and treating capsules containing a basic preparation for an ice cream product, as illustrated in the accompanying drawings, in which.

DESCRIPTION OF THE PREFERRED EMBODIMENTS

Figure 1:
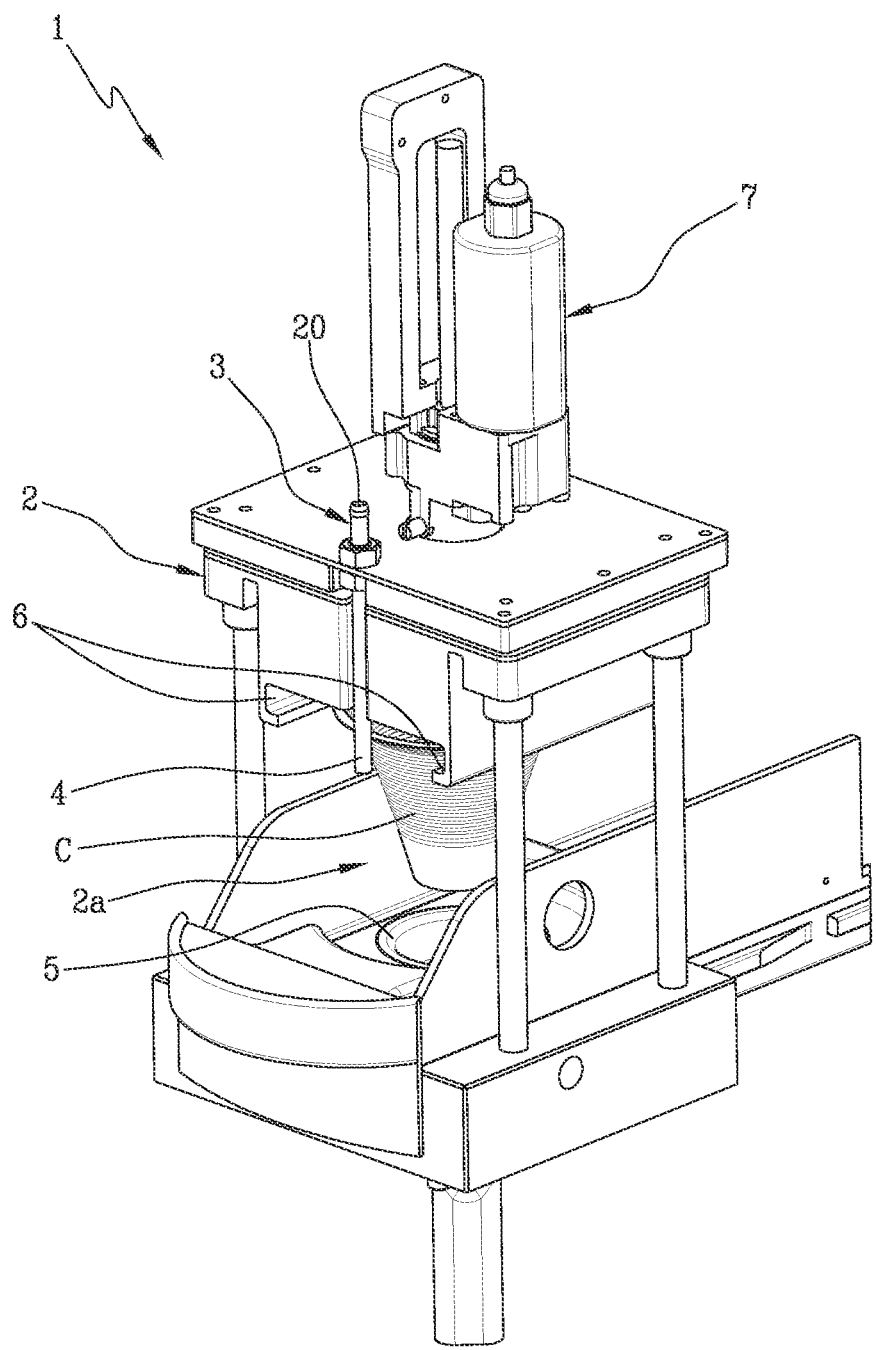
FIG. 1 shows a unit for receiving and treating capsules containing a basic preparation for an ice cream product.
Figure 2:
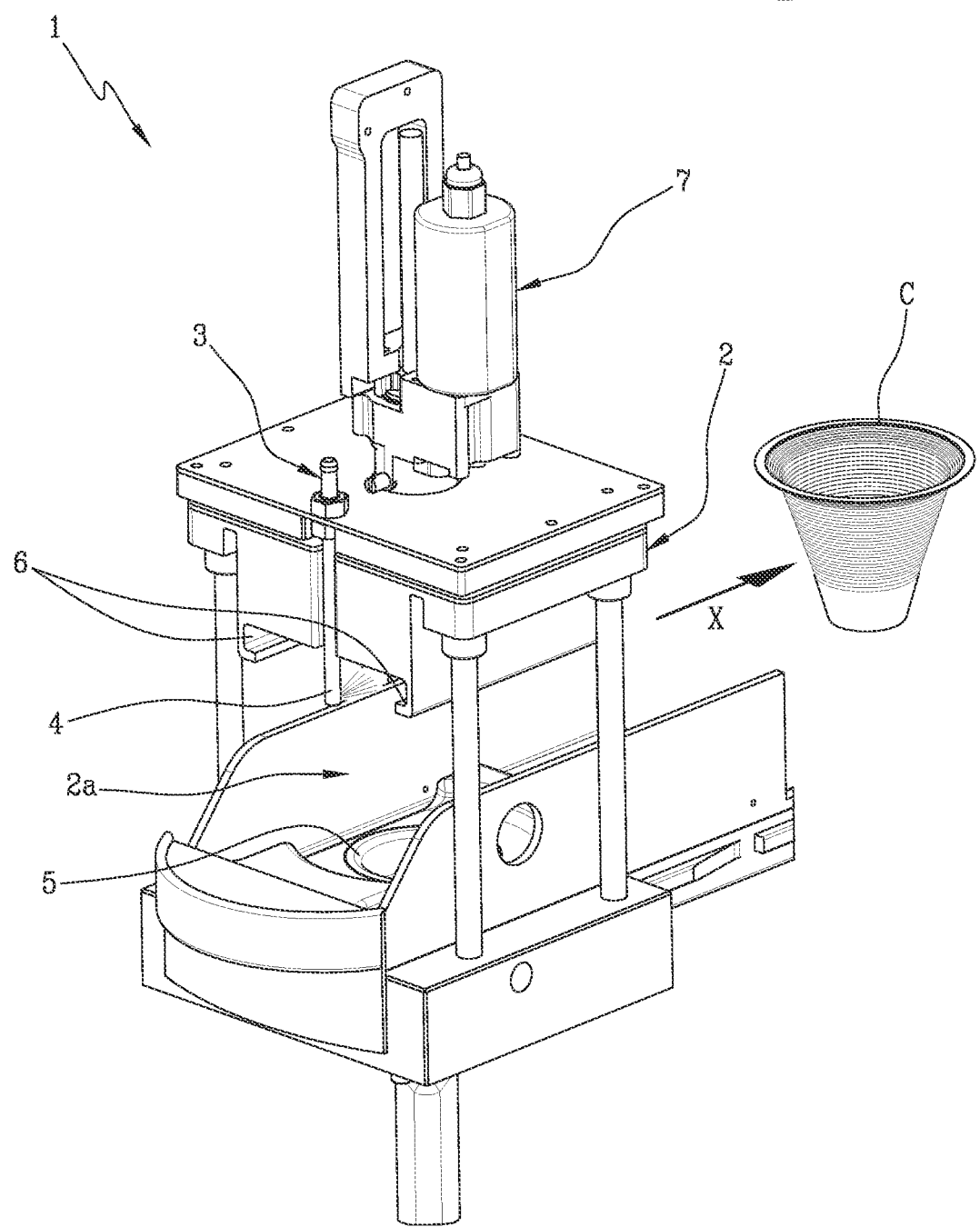
FIG. 2 shows the unit of FIG. 1 during a step of expelling a capsule.
Figure 3:
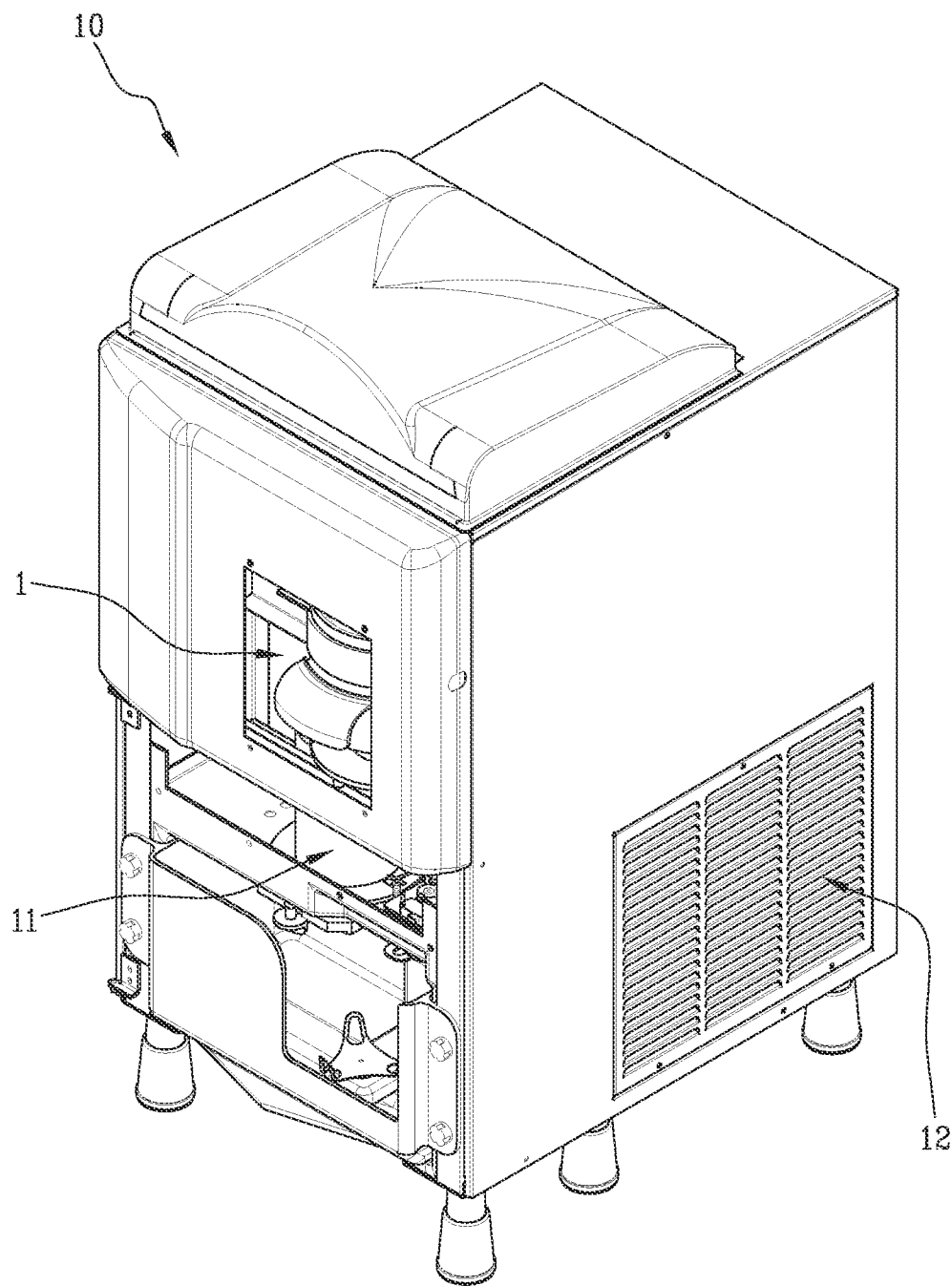
FIG. 3 shows a machine for making liquid and/or semi-liquid products of the ice cream sector, comprising a unit for receiving and treating capsules according to this invention.

The numeral 1 in the accompanying drawings denotes a unit for receiving and treating capsules containing a basic preparation for an ice cream product such as for example: soft serve ice cream, artisan gelato, sorbets, slush drinks and the like.

In the context of the invention, the term "ice cream" is used to mean a food preparation which is based on milk or milk-derived products and to which fruit, aromatics or other ingredients are added to obtain different flavors.

More specifically, the unit 1 comprises:

a retaining unit 2 provided with a retaining housing 2a configured to receive a capsule "C" containing a basic preparation (in powder, liquid or concentrate form) for an ice cream product;

an expulsion device 3 adapted to trigger expulsion of the capsule "C" from the housing.

It should be noted that the basic preparation inside the capsule C may be a powder preparation, a liquid preparation or a concentrate preparation (which, usually, is subsequently diluted with a dilution liquid).

The expulsion device 3 in turn comprises a nozzle 4 which is connectable to a compressed air source 20 and which is configured to emit a jet of air in the direction of the retaining unit 2, specifically along an expulsion direction "X".

The nozzle 4 is directed in such a way that the jet of air can strike the capsule "C" when the latter is inside the retaining housing 2a, thereby pushing it along an expulsion direction "X" and thus expelling it from the retaining housing 2a.

Under the retaining unit 2 there is a processing cavity 5.

The processing cavity 5 defines a passage through which the basic preparation can be emptied from the unit 1 after being extracted from inside the capsule "C" to be fed to another product process/processing station located downstream of the unit 1, such as, for example, a processing container of a machine for making liquid and/or semiliquid products of the ice cream sector.

Advantageously, the retaining unit 2 is movable between an expulsion position, where the capsule faces the nozzle 4, and a processing position, where the capsule is at least partly inside the processing cavity 5.

In other words, the retaining unit 2 can adopt an expulsion position, shown in FIG. 1, where the capsule "C" can be inserted into and expelled from the retaining housing 2a, and where the capsule "C" is preferably spaced from the processing cavity 5 (in order to avoid interference with the walls of the cavity while the capsule "C" is being inserted/expelled).

Once the capsule "C" has been inserted into the retaining housing 2a, the retaining unit 2 can be brought to the processing position, where the capsule, specifically a bottom portion thereof, is at least partly inserted into the processing cavity 5.

That way, the basic preparation can be extracted from the capsule and conveyed through the processing cavity 5 to a product process/processing station located downstream of the unit 1 efficiently and avoiding the risk of the basic preparation leaking out.

Advantageously, the unit 1 comprises an actuator 22 of the retaining unit 2, configured to move the retaining unit 2 (preferably vertically) from the expulsion position to the processing position.

Advantageously, the retaining unit comprises guides 6 which contribute to defining the retaining housing 2a.

The guides 6 are adapted to receive an upper edge portion of the capsule "C", constraining it to run only along the expulsion direction "X".

In other words, once the capsule "C" has been inserted into the housing 2, the edge of its upper wall is locked to guides 6 which hold it in a position where it can slide only along the expulsion direction "X" both during its insertion into the retaining unit 2 and during its expulsion therefrom after being struck by the air jet from the nozzle 4.

More specifically, once the capsule "C" has been inserted into the housing 2, it is locked to the guides 6 by the edge of its upper wall.

The guides 6 thus define a pair of facing rails, each of which slidably engages opposite portions of the upper edge of the capsule "C".

It follows that when the retaining unit 2 is in the expulsion position, the nozzle 4 faces the retaining housing 2a, hence the guides 6, and the jet of air is delivered along the expulsion direction "X" which is substantially parallel to the main direction of extension of the guides 6.

The unit 1 also comprises a dispensing unit 7 equipped with at least one element which comes into contact with an upper wall of the capsule "C".

Figure 4:
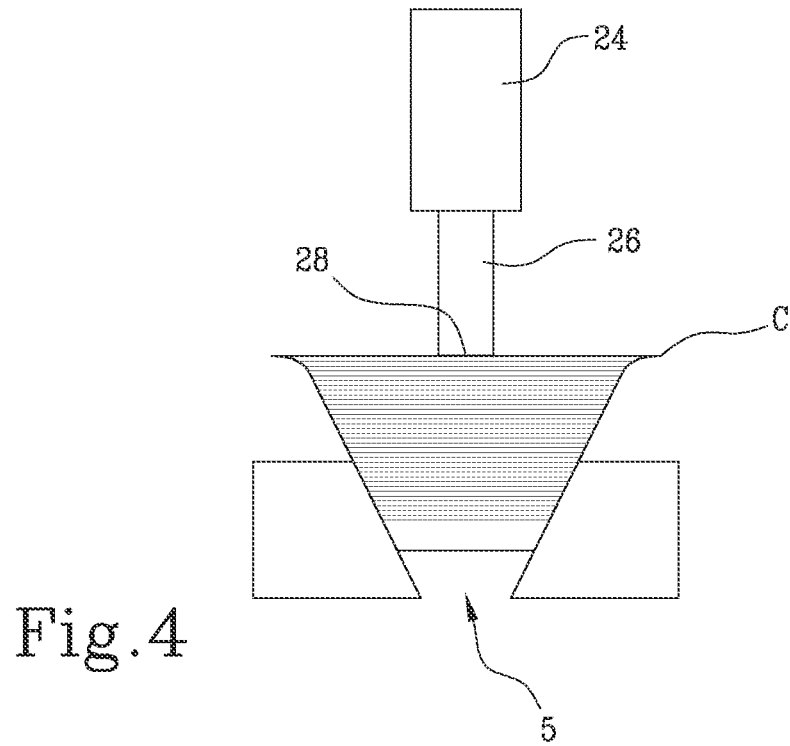
FIG. 4 shows a partial schematic view of the dispensing unit and capsule in a compressed position.

The contact element 26 is movable between a spaced-apart position (FIG. 1) relative to the capsule "C" and a contact and compression position (FIG. 4) where a contact surface 28 of the contact element 26 applies pressure on the upper wall of the capsule "C", causing it to be compressed.

In particular, the unit comprises an actuator 24 of the dispensing unit, configured to move the dispensing unit 7 (preferably vertically) from the spaced-apart position to the contact and compression position and vice versa.

Advantageously, a unit 2 according to this invention allows guaranteeing a high level of efficiency and automation, eliminating the risk of accidentally contaminating the product during production.

Figure 5:
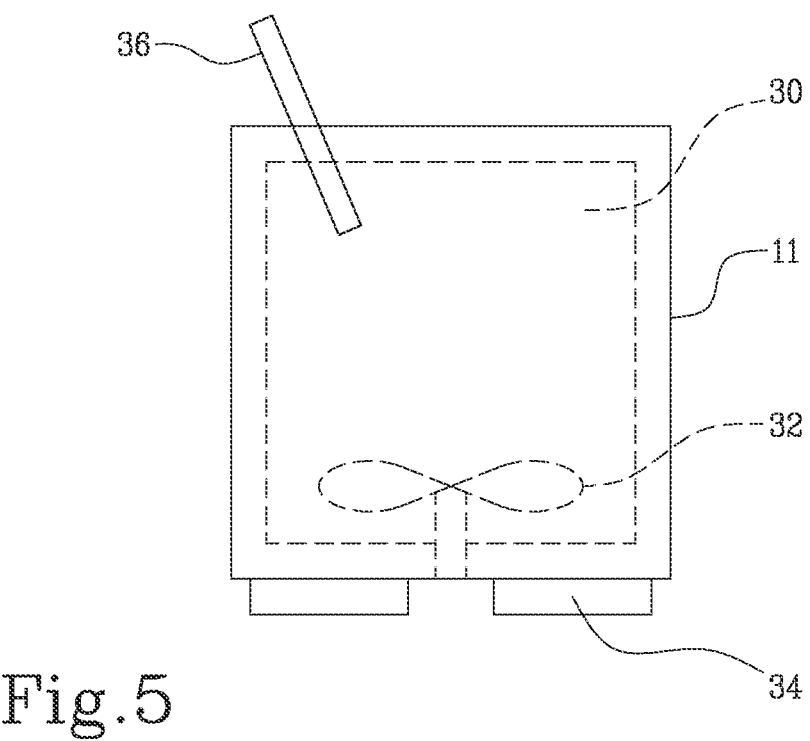
FIG. 5 shows a schematic view of the processing container.

This invention also has for an object a machine 10 for making liquid and/or semi-liquid products of the ice cream sector, comprising:
a unit 1 for receiving and treating capsules containing a basic preparation for an ice cream product, as described in the foregoing;
a processing container 11 forming a processing chamber 30 (see FIG. 5);
a stirrer 32 mounted inside the processing chamber;
a cooling system 12, provided with at least one heat exchanger 34 associated with the processing container for exchanging heat therewith and cooling it;
a diluting liquid injection nozzle 36 for injecting a diluting liquid into the processing container.

The machine 10, in the more general aspects of it, is for example of the type described in invention patent application EP3158872 in the name of ALI S.p.A.—CARPIGIANI GROUP.

According to another aspect, also defined is a method for making liquid or semi-liquid products in a machine for making liquid and/or semi-liquid products of the ice cream sector, comprising an initial step of preparing a machine for making liquid and/or semi-liquid products of the ice cream sector, as described in the foregoing.

This is followed by a step of loading into the housing 2 of the unit 1 a capsule "C" containing a basic preparation, such as, for example, a basic preparation for an ice cream product.

Operatively, that means inserting the capsule "C" into the retaining unit 2 so that its upper edges engage the guides 6 and sliding it along the expulsion direction "X" into the retaining housing 2a.

Once the capsule "C" has been correctly positioned, the dispensing unit is activated in order to open and compress the capsule so that the basic preparation is squeezed out of it.

The basic preparation is then transferred from the capsule "C" to the processing container 11.

When all of the basic preparation has been transferred, there is a step of feeding a diluting liquid into the container 11.

Next, the basic preparation is stirred in order to mix the diluting liquid into it by means of the stirrer located in the processing chamber.

At the same time, the mixture of basic preparation and diluting liquid is cooled to a temperature of between −15° C. and −2° C. so as to make a portion of ice cream;

Lastly, the method further comprises a step of activating the expulsion device 3 in such a way as to trigger expulsion of the capsule C from the retaining housing 2a along the expulsion direction "X".

Preferably, the capsule "C" is inserted into, and expelled from, the retaining housing 2a when the retaining unit 2 is placed in the expulsion position and the basic preparation is extracted from the capsule "C" when the retaining unit 2 is in the processing position.

In other words, the method of this invention involves moving the retaining unit 2 (preferably vertically) from the expulsion position to the processing position before proceeding to the step of transferring the basic preparation from the capsule "C" to the processing container.

The method disclosed herein also involves moving the retaining unit 2 (preferably vertically) from the processing position to the expulsion position before proceeding to the step of activating the expulsion device to expel the capsule from the retaining housing 2a.

More specifically, the step of activating the expulsion device comprises a step of activating an air flow through the nozzle 4 directed towards the retaining unit 2 in such a way as to cause the capsule "C" to be expelled from the retaining housing 2a along the expulsion direction "X".

Advantageously, this invention achieves the preset aims by overcoming the disadvantages of the prior art and providing the user with a unit for receiving and treating capsules containing a basic preparation for an ice cream product, with a machine equipped with such a unit and with a method for using the machine to allow overcoming the technical shortcomings of the prior art outlined above and to allow the capsule expulsion process to be managed in a highly efficient and automated manner.

The invention claimed is:

1. A unit for receiving and treating a capsule containing a basic preparation for an ice cream product, comprising:
   a retaining unit including a retaining housing configured to receive the capsule containing the basic preparation for the ice cream product;
   an expulsion device comprising a nozzle connectable to a compressed air source, the nozzle being configured to emit a jet of air in a direction of the retaining unit and to strike the capsule when the capsule is inside the retaining housing to expel the capsule from the retaining housing along an expulsion direction;
   wherein the retaining unit comprises guides defining the retaining housing and adapted to receive an upper edge portion of the capsule, the guides being configured to constrain the capsule to move along the expulsion direction;
   the guides including a pair of facing rails, each of which slidably engages opposite portions of an upper edge of the capsule;
   wherein the retaining unit is movable between an expulsion position, where the capsule faces the nozzle, and a processing position, where the capsule is at least partly inside the processing cavity.

2. The unit according to claim 1, and further comprising a processing cavity located at a bottom of the retaining unit.

3. The unit according to claim 1, wherein the retaining unit is movable vertically between the expulsion position and the processing position.

4. The unit according to claim 1, and further comprising an actuator configured to drive the retaining unit between the expulsion position and the processing position.

5. The unit according to claim 1, and further comprising a dispensing unit including a contact element with a contact surface which comes into contact with a top wall of the capsule, the contact element being movable between a spaced-apart position where the contact surface is spaced from the capsule and a contact and compression position where the contact surface compresses the top wall of the capsule.

6. The unit according to claim 5, and further comprising an actuator of the dispensing unit, operatively associated with the dispensing unit to drive the dispensing unit between the spaced-apart position and the contact and compression position.

7. A machine for making at least one chosen from liquid and semi-liquid products of the ice cream sector, comprising:
   the unit according to claim 1;
   a processing container forming a processing chamber for making an ice cream product;
   a stirrer mounted inside the processing chamber;
   a cooling system including at least one heat exchanger operatively connected with the processing container, to exchange heat with the processing container to cool the processing container;
   an injection nozzle for injecting a dilution liquid into the processing container.

8. A method for making at least one chosen from liquid and semi-liquid products of the ice cream sector, comprising the following steps:
   providing a machine for making the at least one chosen from liquid and semi-liquid products of the ice cream sector, comprising:
      a unit for receiving and treating a capsule containing a basic preparation for an ice cream product, comprising:
         a retaining unit including a retaining housing configured to receive the capsule containing the basic preparation for the ice cream product;
         an expulsion device comprising a nozzle connectable to a compressed air source, the nozzle being configured to emit a jet of air in a direction of the retaining unit and to strike the capsule when the capsule is inside the retaining housing to expel the capsule from the retaining housing along an expulsion direction;
         wherein the retaining unit comprises guides defining the retaining housing and adapted to receive an upper edge portion of the capsule, the guides being configured to constrain the capsule to move along the expulsion direction;
         the guides including a pair of facing rails, each of which slidably engages opposite portions of an upper edge of the capsule;
         wherein the retaining unit is movable between an expulsion position, where the capsule faces the nozzle, and a processing position, where the capsule is at least partly inside the processing cavity;
      a processing container forming a processing chamber for making an ice cream product;
      a stirrer mounted inside the processing chamber;
      a cooling system including at least one heat exchanger operatively connected with the processing container, to exchange heat with the processing container to cool the processing container;
   an injection nozzle for injecting a dilution liquid into the processing container;
   positioning the capsule in the housing of the receiving and treatment unit;
   transferring the basic preparation from the capsule to the processing container;
   feeding the dilution liquid into the processing container;
   stirring and mixing the basic preparation and the dilution liquid with the stirrer, and simultaneously cooling the basic preparation and the dilution liquid to a temperature between $-2°$ C. and $-15°$ C. so as to make a portion of ice cream;
   activating the expulsion device to expel the capsule from the retaining housing by emitting a jet of air through the nozzle in the direction of the retaining unit, the jet of air striking the capsule and causing the capsule to slide along the expulsion direction.

9. The method according to claim 8 and further comprising:
   providing that the unit comprises a processing cavity located at a bottom of the retaining unit.

10. The method according to claim 8 and further comprising:
    providing that the retaining unit is movable vertically between the expulsion position and the processing position.

11. The method according to claim 8 and further comprising:
    providing that the unit further comprises an actuator configured to drive the retaining unit between the expulsion position and the processing position.

12. The method according to claim 8 and further comprising:
    providing that the unit further comprises a dispensing unit including a contact element with a contact surface which comes into contact with a top wall of the capsule, the contact element being movable between a spaced-apart position where the contact surface is spaced from the capsule and a contact and compression position where the contact surface compresses the top wall of the capsule.

13. The method according to claim 8 and further comprising:
providing that the unit comprises an actuator of the dispensing unit, operatively associated with the dispensing unit to drive the dispensing unit between the spaced-apart position and the contact and compression position.

* * * * *